(12) United States Patent
Oyama et al.

(10) Patent No.: US 7,457,009 B2
(45) Date of Patent: Nov. 25, 2008

(54) IMAGE READING APPARATUS AND IMAGE FORMING APPARATUS

(75) Inventors: Hiroshi Oyama, Tokyo (JP); Tadashi Matsudaira, Tokyo (JP); Katsunori Takahashi, Tokyo (JP); Masayuki Watanabe, Tokyo (JP); Shinpei Kawasaki, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 941 days.

(21) Appl. No.: 10/716,905

(22) Filed: Nov. 19, 2003

(65) Prior Publication Data

US 2004/0100667 A1 May 27, 2004

(30) Foreign Application Priority Data

Nov. 22, 2002 (JP) .............................. 2002-339002

(51) Int. Cl.
*H04N 1/04* (2006.01)
*H04N 1/40* (2006.01)

(52) U.S. Cl. ........................ 358/483; 358/474; 358/475; 358/448

(58) Field of Classification Search ................. 358/483, 358/474, 475, 448, 449
See application file for complete search history.

(56) References Cited

FOREIGN PATENT DOCUMENTS

| JP | 09-200449 A | 7/1997 |
|---|---|---|
| JP | 9-289590 A | 11/1997 |
| JP | 11-122436 A | 4/1999 |
| JP | 2000-092291 A | 3/2000 |

*Primary Examiner*—Houshang Safaipour
(74) *Attorney, Agent, or Firm*—Frishauf, Holtz, Goodman & Chick, P.C.

(57) ABSTRACT

In order to shorten a time for preliminary original reading which is performed prior to reading of an original image, an image reading apparatus of the present invention scans an original mounted on a platen glass by a scan optical system that moves to the original and reads a scanned image of the original by using a CCD sensor, the apparatus having a function to perform a preliminary original read operation for automatically deciding a density of the original before the reading operation of the original image, wherein the preliminary original reading is performed while the scan optical system in an idling state is moving from a read standby position to an image read operation start position; a white background level correction operation of the CDD sensor is performed after collection of original density data by the preliminary original read operation; and a result of the correction is reflected on the original density data obtained by the preliminary original reading to control the decision of the original density.

14 Claims, 5 Drawing Sheets

IMAGE READING APPARATUS AND IMAGE FORMING APPARATUS

BACKGROUND OF THE INVENTION

1. Field of the Invention

The present invention relates to an image reading apparatus for reading an image of an original mounted on a platen glass and an image forming apparatus, such as a copying machine, for forming an image of an original image using the image reading apparatus equipped.

2. Description of the Prior Arts

In an image reading apparatus for reading an image of the original mounted on a platen glass using a scan optical system adapted to move, if image data thus read are used to expose the image as they are onto a photosensitive body, it is difficult to obtain an image having an appropriate density. In order to correct a density of a read original image, preliminary original reading which is referred to as pre-scan is performed prior to an actual scan operation, and image information obtained by reading part of the original image is used to perform density correction on the image data which are read by actual scanning.

Japanese Patent Application KOKAI Publication No. 9-289590 (1997-289590) describes an approach by which, in an analog copying machine, in reading of an original, a density of the original is read when a scan optical system moves to a reading operation start position. It also describes an approach of providing means for altering a scanner stop position in a standby state, to reserve an original scan region for reading of the original density.

In a digital copying machine, an image of an original is read by a CCD sensor, so that data of the read image are converted by an A/D conversion circuit into a digital signal. In the digital copying machine, the read image data need to undergo correction of a relationship between a quantity of light reflected by an exposure lamp and a white background level of the original, wherein specifically shading correction is performed by reading the white background level, which is a quantity of light reflected from a white background portion illuminated by the exposure lamp, which quantity provides a reference before original reading.

In the digital copying machine, it is necessary to perform a shading operation, a preliminary original reading operation for automatic original density determination (EE), or an APS operation for automatic original size determination, before the original image is read. Conventionally, shading correction has been performed for correcting the white background level, prior to the preliminary original reading operation for original density decision, which provides the reference of the original density. Therefore, it takes a long time before a primary original scan operation starts, resulting in a drawback that there causes poor operability in copying to a user.

SUMMARY OF THE INVENTION

It is an object of the present invention to provide an image reading apparatus having improved copy operability and an image forming apparatus equipped with the reading apparatus that solve these problems to reduce a time elapsing from a moment when a copy button is depressed to a moment when a primary original scan operation starts.

To solve the problems and to achieve the object, the present invention proposed the following configuration.

According to a first aspect of the present invention, an image reading apparatus of the present invention scans an original mounted on a platen glass by a scan optical system that moves to the original and reads a scanned image of the original by using a CCD sensor, the apparatus having a function to perform a preliminary original reading operation for automatically determining a density of the original before the reading operation of the original image, wherein the preliminary original reading is performed while the scan optical system in an idling state is moving from a read standby position to an image read operation start position; a white background level correction operation of the CDD sensor is performed after collection of original density data by the preliminary original reading operation; and a result of the correction is reflected on the original density data obtained by the preliminary original reading to control the decision of the original density.

According to the first aspect, control is conducted so that shading may be performed after the preliminary original reading operation, thus making it possible to reduce a time spent until the start of primary original image reading.

In an image reading apparatus according to a second aspect of the present invention, if the preliminary original reading operation is performed in a condition where a platen cover is open, detection of an original size in a main scan direction and determination of an original density are performed simultaneously based on image data collected by the preliminary original reading operation, and if the preliminary original reading operation is performed in a condition where the platen cover is closed, the original size is detected in a process of the platen cover being closed.

According to the second aspect, in both cases of copying in a condition where the platen cover is closed and copying in a condition where it is closed, no time is spent in an APS operation for determination of the original size, thus making it possible to reduce a time spent until the start of primary original image reading.

An image reading apparatus according to a third aspect of the present invention has a preliminary original reading system for performing a preliminary original reading operation independently of a preliminary original reading system for performing the preliminary original reading operation when a scan optical system is moving from a read standby position to an image read operation start position, thus enabling changing the preliminary original reading systems by setting.

In the third aspect, the apparatus has also the system that enables altering a preliminary original reading operation time for automatic original density determination in accordance with a required degree of an image quality, so that it is possible to select either reducing the time spent until the start of primary original image reading or enabling sophisticated automatic original density determination at the cost of the time.

An image reading apparatus according to a fourth aspect of the present invention has a function for permitting a user to specify a kind of an original, so that the read standby position is altered in accordance with the specified kind of the original in a condition where the kind of the original is specified, thus changing an original scan region at the time of preliminary original reading.

In the fourth aspect, as the user selects the kind of the original such as a photograph image, a print image, or a color image, the original scan region changes, so that sophisticated automatic original density determination is performed while reducing the time spent until the start of primary original image reading.

An image forming apparatus according to a fifth aspect of the present aspect is equipped with an image reading apparatus according to any one of the first through fourth aspects, to form an image by using image data read by the image reading apparatus.

According to the fifth aspect, an image forming apparatus is provided which is equipped with an image reading apparatus having effects described in relation to the first through fourth aspects and which forms an image by using image data read by the image reading apparatus, thereby satisfying user's requirements.

Figure 1:
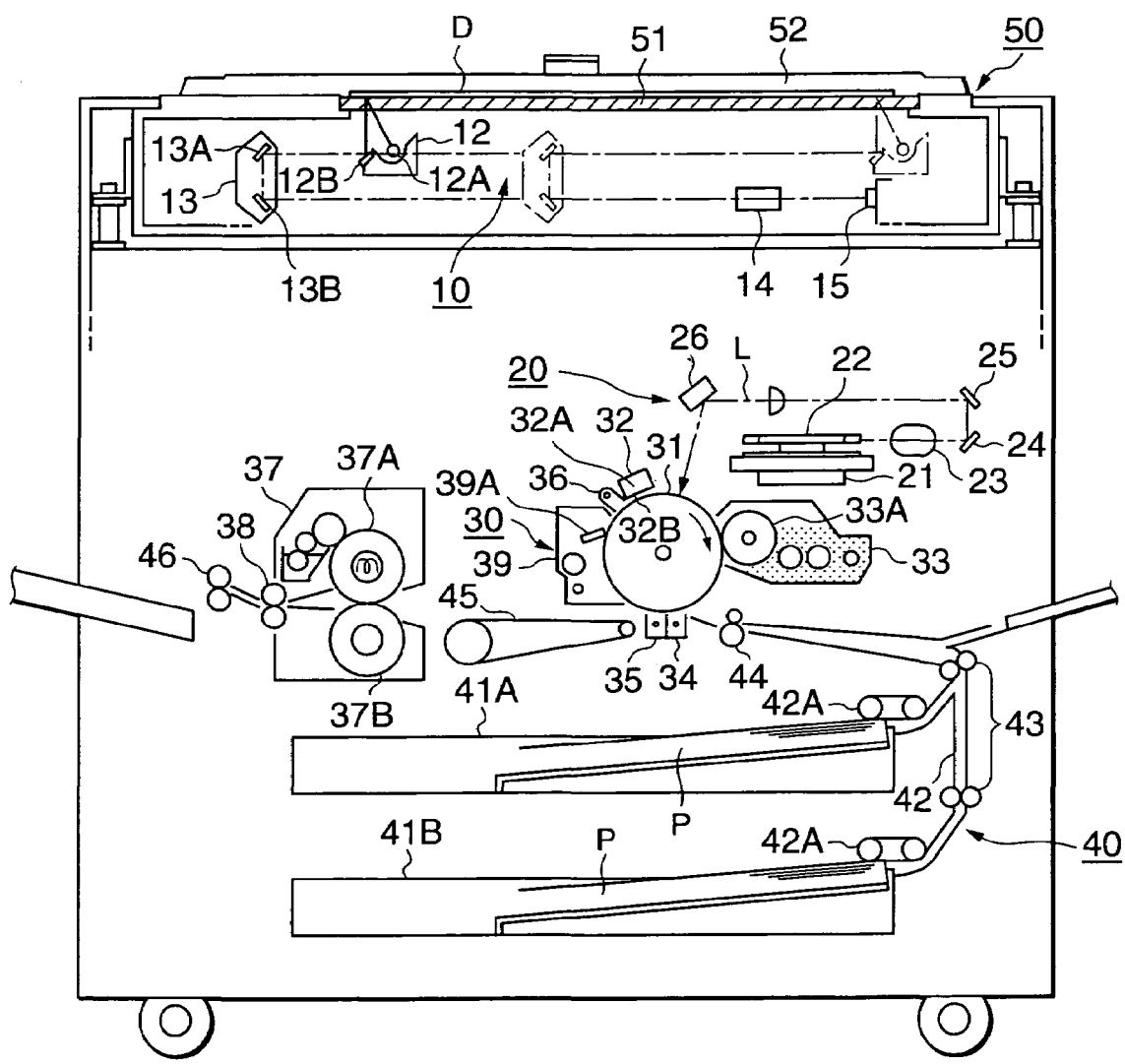
FIG. 1 is a cross-sectional view for showing a construction of an image forming apparatus.

DETAILED DESCRIPTION OF THE PREFERRED EMBODIMENTS (1) The following will describe a construction and operations of an image reading apparatus according to the present invention and an image forming apparatus equipped with the image reading apparatus. However, the image forming apparatus of the present invention is not limited to that of such a configuration as shown in FIG. 1 but may include a color image forming apparatus for forming a color image by superimposing toner images one on another.

The apparatus comprises an original image reading section 10, a laser writing section 20, an image forming section 30, and a sheet feeding section 40.

The original image reading section 10 is configured as an independent image reading device 50 separate from a body of the apparatus and mounted and fixed to an upper face of the apparatus body.

The image reading device 50 comprises a platen glass 51 made of a transparent glass plate 51 as an upper part of the device and a platen cover 52 for covering an original D mounted on the platen glass 51 and is further equipped, below the platen glass 51, with a scan optical system composed of a first mirror unit 12 and a second mirror unit 13 and the image reading section 10 composed of a main lens 14, an image pickup device 15 such as CCD array, etc. The first mirror unit 12 is equipped with an illumination lamp 12A and a first mirror 12B and mounted in such a manner that it can straightly move in parallel with the platen glass 51 and horizontally in the figure, thus optically scanning an entire surface of the original D. The second mirror unit 13 integrally comprises a second mirror 13A and a third mirror 13B and straightly moves horizontally at half a speed of the first mirror unit 12 to always keep a predetermined optical path. Of course, similar to the first mirror unit 12, the second mirror unit 13 also moves parallel to the platen glass. An image of the original D on the platen glass 51 which is illuminated by the illumination lamp 12A passes through the main lens 14, the first mirror 12B, the second mirror 13A, and the third mirror 13B and is formed on the image pickup device 15. When a start button is depressed, the first mirror 12 and the second mirror unit 13 are moved, to perform a preliminary original reading operation and an original reading operation in this order. When scanning is finished, the first mirror unit 12 and the second mirror unit 13 return to an original standby position and wait until a next image formation starts.

Data of the image obtained by the image pickup device 15 are converted into a digital signal, which undergoes at an image signal processing section (not shown) image data processing by use of a shading correction value and an original density correction value which are obtained by the preliminary original reading operation and is once stored as an image signal in a memory. Next, the image signal is input to the laser writing section 20.

When the image signal from the memory is input under the control of a control section to the laser writing section 20 comprised of a drive motor 21, a polygon mirror 22, an fθ lens 23, mirrors 24, 25, and 26, a semiconductor laser and a correction lens which are not shown, etc., the laser writing section 20 starts recording of the image. Next, at the image forming section 30, a photosensitive drum 31, which is an image carrier, is already rotated clockwise as shown by an arrow and discharged by a charge remover 36 for removing charge by means of pre-charge exposure and then charged by a charge 32 having a discharge wire 32A and a charging grid 32B, so that an electrostatic latent image that corresponds to the original D is formed on the photosensitive drum 31 with a laser beam L of the laser writing section 20. Then, the electrostatic latent image on the photosensitive drum 31 undergoes inversion development by use of a developer carried by a developing sleeve 33A supplied with a bias voltage obtained by superimposing an AC component on a DC component of a developing device 33, thus providing a visible toner image.

On the other hand, a sheet feeding cassette 41A or 41B loaded in the sheet feeding section 40 delivers out sheets of transfer paper P having a specified size one by one through a delivering roller 42A and supplies them through a delivering roller 43 and a guide member 42 toward an image transferring section. The transfer paper P thus supplied is sent onto the photosensitive drum 31 through a registration roller 44 operating in synchronization with the toner image present on the photosensitive drum 31. The toner image on the photosensitive drum 31 is transferred onto this transfer paper P, separated from the photosensitive drum 31 by a discharging action of a separator 35, sent via a conveyor belt 45 to a fixing device 37, where the toner image is melted and fixed by a heating roller 37A and a pressure roller 37B respectively, and delivered out to a tray outside the apparatus by sheet delivering rollers 38 and 46.

The photosensitive drum 31 continues rotating so that residual toner left un-transferred on the surface may be removed for cleanout by a cleaning blade 39A butting against the surface in a cleaning device 39. It is discharged again by the charge remover 36 and then charged uniformly by the charger 32, thus entering a next process of image formation.

Figure 2:
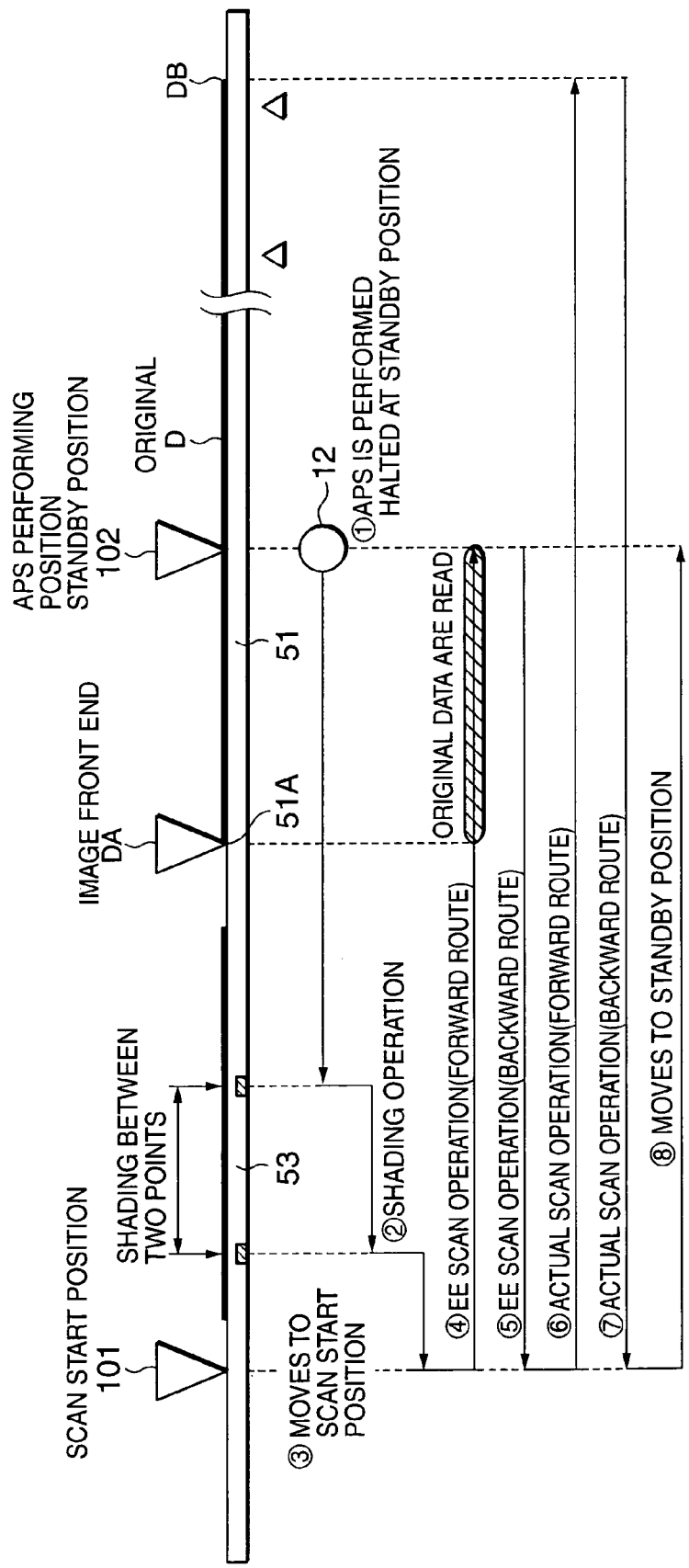
FIG. 2 is an explanatory illustration of a conventional original reading operation.

(2) The following will describe conventional operations for original reading with reference to an explanatory illustration of FIG. 2 before describing those of the present invention.

The original D is mounted on the platen glass 51 and its image front end DA is set to a platen glass end face 51A. The first mirror unit 12 for preliminarily reading an original image is halted at a position facing the original D separate by 30-50 mm from the image front end DA in the platen glass 51, which position serves as a standby position 102.

When the copy start button is depressed, the illumination lamp 12A lights, so that ① automatic original size determination (APS) is performed while the first mirror unit 12 is in a halt condition and, after APS is performed, it moves toward a scan start position 101. When the first mirror unit 12 thus moves and passes by a reference white background face 53 as facing it, ② a shading operation is performed and, therefore, ③ the first mirror unit 12 arrives at the scan start position 101.

The first mirror unit 12 turns back and ④ goes through EE scan operation (forward route) to read original data preliminarily for automatic original density determination (EE) in a range facing the original D and turns back at the standby position 102 and ⑤ goes through EE scan operation (backward route) to arrive at the scan start position 101.

The first mirror unit 12 turns back again and ⑥ goes through the actual scan operation (forward route) to read image density data over an entire screen of the original D determined by the automatic original size determination (APS) performed earlier and turns back at a position slightly separate from an image rear end DB of the original D and ⑦ goes through the actual scan operation (backward route) to arrive at the scan start position 101. Here, the first mirror unit 12 turns back again and ⑧ moves to the standby position and stops at the standby position 102 to get ready for next reading of the original image.

(3) The following will describe an original image reading operation and read information processing according to the present invention.

Figure 3:
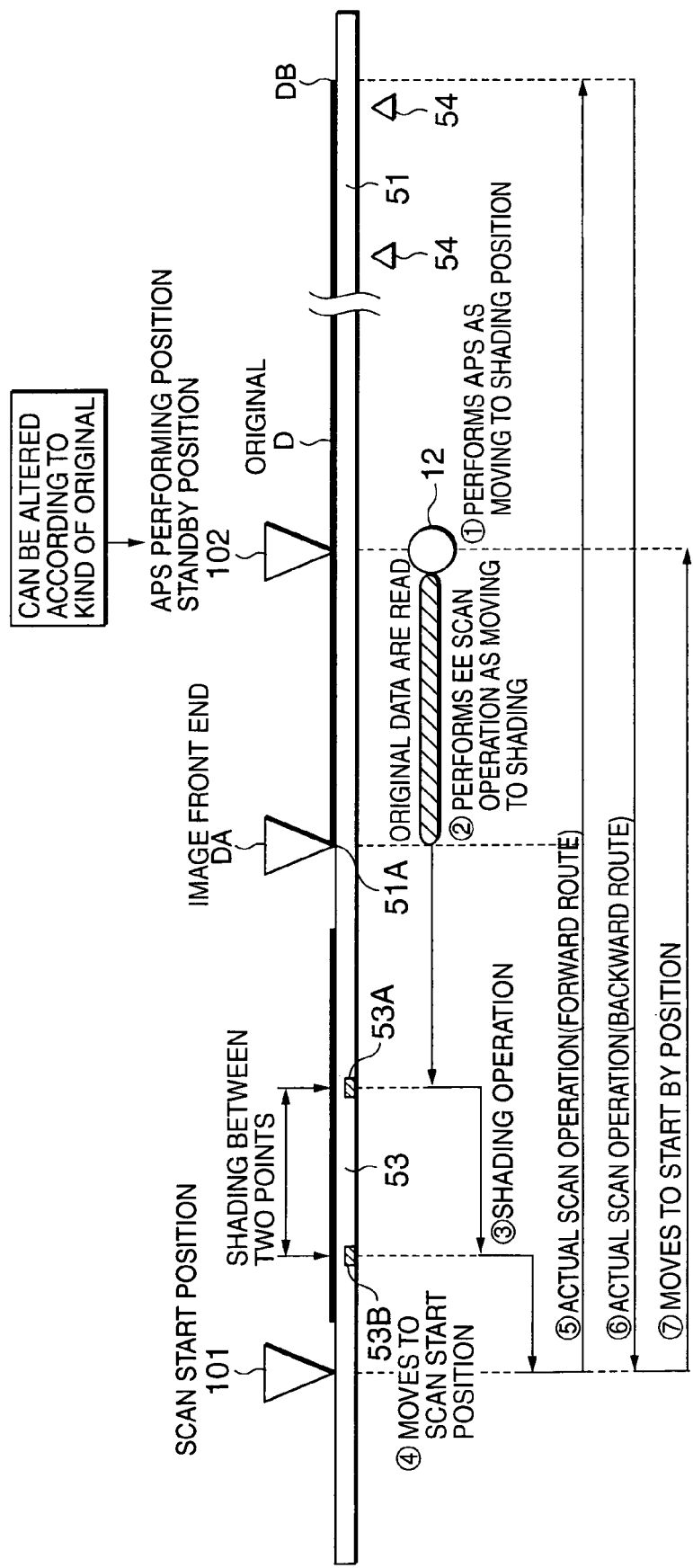
FIG. 3 is an explanatory illustration of an original reading operation according to the present invention.
Figure 4:
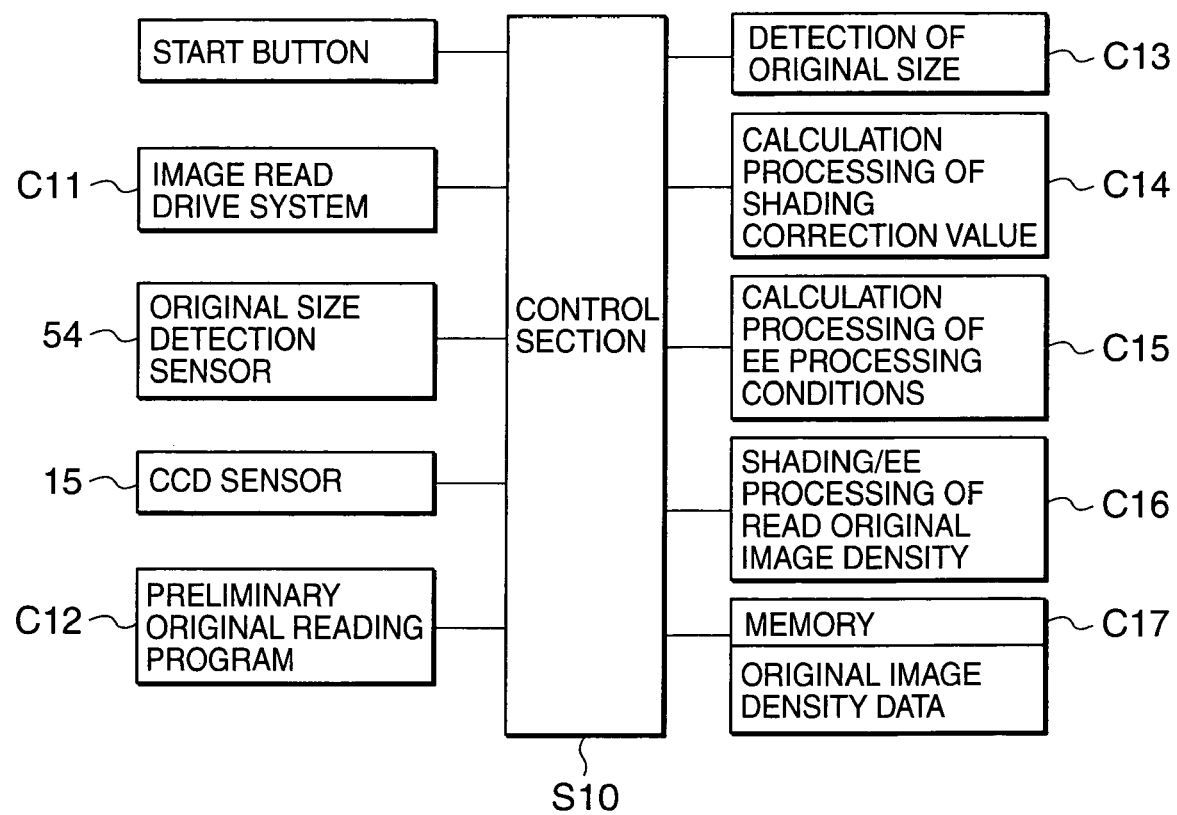
FIG. 4 is a block diagram for showing control of original image reading.
Figure 5:
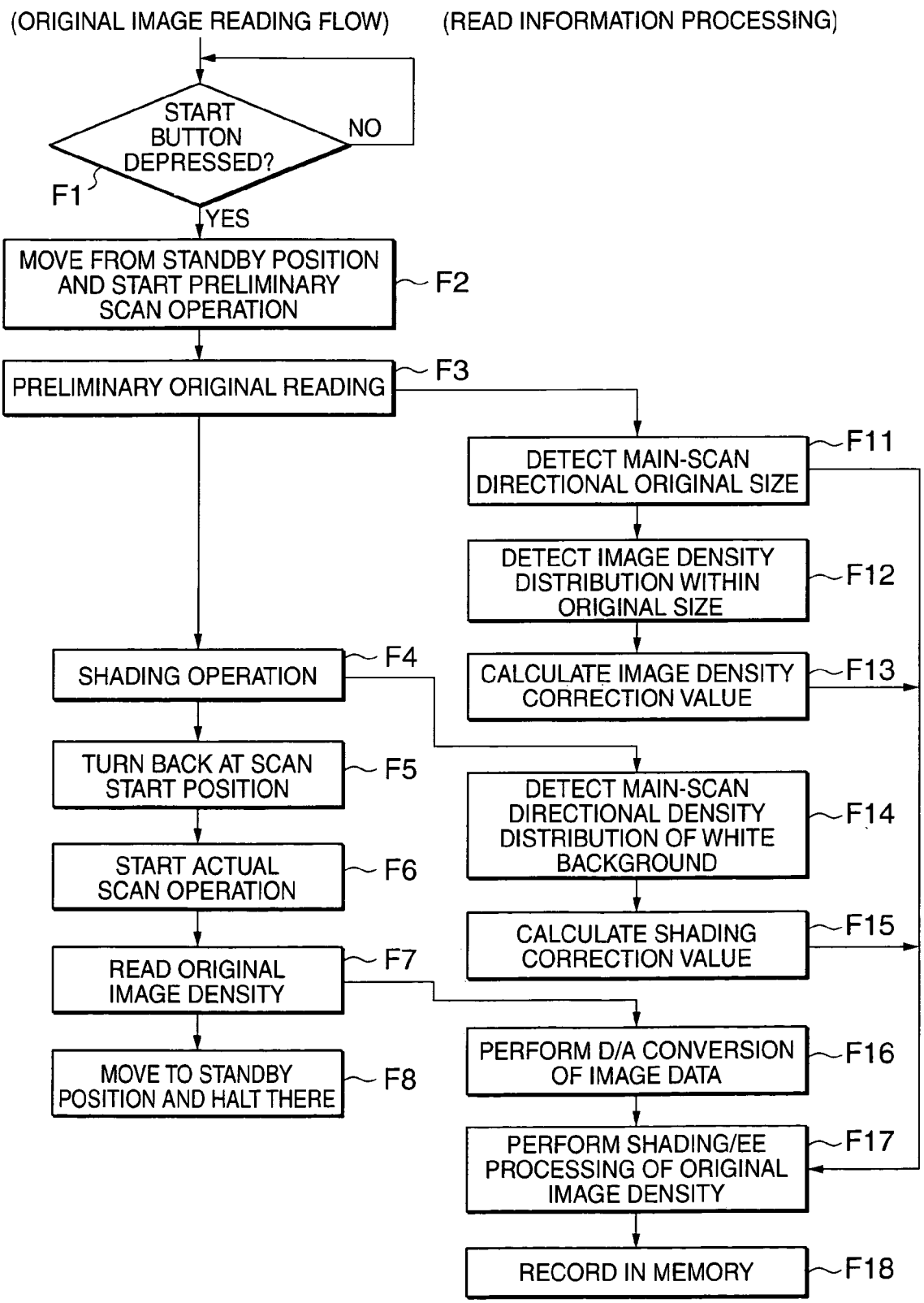
FIG. 5 is a flowchart for showing reading of an original image and processing of the read information.

In the present invention, the control section controls such that the shading operation may be performed after a preliminary original reading operation. FIG. 3 is an explanatory illustration of the original reading operation, FIG. 4 is a block diagram for showing control of original image reading, and FIG. 5 is a flowchart for showing original image reading and read information processing.

Prior to a copy operation, the original D is mounted on the platen glass 51 and its image front end DA is set to the platen glass end face 51A. The first mirror unit 12 for preliminarily reading an original image is halted at a position facing the original D separate by 30-50 mm from the image front end DA in the platen glass 51, which position serves as the standby position.

In the vicinity of the rear end DB of the original D on the platen glass 51, there is provided an original size sensor 54 which is constituted of a plurality of photo-couplers and which detects, for example, a sub-scan directional original size such as A4 size or B4 size, so that the sub-scan directional original size is detected on, for example, whether it is A4 size or B4 size, based on a state of a quantity of reflected light received in a condition where the platen cover 52 is open. When copying operation is performed in a condition where the platen cover 52 is closed over the original D, a process state of the platen cover 52 being closed is detected by a platen open/closed sensor not shown and indicated by short-period lighting of the illumination lamp 12A, while the image pickup device 15 using a CCD sensor detects a main-scan directional original size (C13). The detected original size is once recorded in the memory (C17). When copying operation is performed in a condition where the platen cover 52 is open, on the other hand, main-scan directional original size detection and original density determination are performed simultaneously based on image data collected by the preliminary original reading operation.

It is to be noted that the shading operation need not always be performed at the time of returning but may be performed halfway through the actual scan operation or before the original data are read.

In FIG. 3, preliminary original reading covers a region ranging from the standby position 102 to the front end DA of the original D and original reading covers a region ranging from the front end DA of the original D to the rear end DB of the original D.

When the copy start button not shown is depressed (F1), a control section (C10) drives an image reading drive system (C11) including the first mirror unit 12 positioned at the standby position 102, to light the illumination lamp 12A. Then, the first mirror unit 12, while moving to a shading position (F2), reads a preliminary original (F3), thus performing preliminary original data reading for the purpose of ① automatic original size determination (APS) and ② automatic original density determination (EE).

The control section C10 detects a main-scan directional image density distribution a plurality of number of times within an original size, which original size is determined on the basis of a difference in main-scan directional density of the original D detected by the CCD sensor 15 (F11), so that an image density correction amount required by the EE processing is calculated from the detected main-scan directional image density distribution.

When the first mirror unit 12 moves and passes by the reference white background face 53 as facing it, ③ a shading correction amount is read. That is, the density distribution is detected a plurality of number of times in a main-scan direction over the reference white background face 53 sandwiched between two points 53A and 53B (F14), based on which data the control section (C10) calculates the shading correction amount.

The first mirror unit 12 ④ moves to the scan start position 101 and turns back ⑤ to perform the actual scan operation (forward route), so that an original image density is read over the entire screen of the original D for which the automatic original size determination (APS) has been performed earlier (F7).

The control section (C10) uses a calculated shading correction amount (C14) and calculated EE processing conditions and reflects the shading correction amount on the EE processing conditions (C15), to performs shading/EE processing of an original image density (F17), so that data of the processed original image density is recorded in a memory (C17) and (F18).

After having finished reading the image density over the entire surface of the original D, the first mirror unit 12 ⑥ goes through the actual scan operation (backward route) and once returns to the scan start position 101 and then ⑦ moves to the standby position to sops at the standby position 102 (F8).

(4) Besides the preliminary original reading system of the present invention described in (3) above, the present invention has, for example, such a preliminary original reading system as described in (2) above, in which systems respective preliminary original reading programs are recorded as (C12) in the memory. In the image forming apparatus, it is decided beforehand which one of these programs is to be used and set in the preliminary original reading, for reading of the original. By employing the preliminary original reading system described in (2) to make settings so that a sufficient preliminary original reading range (spacing between the image front end DA and the standby position 102) may be provided, the copy processing time is reduced; to improve processibility, the preliminary original reading system according to the present invention described in (3) above is employed; and to emphasize an image quality of a copy image while placing less emphasis on an improvement in a processing time, the preliminary original reading system described in (2) is employed. By thus selecting the systems, the original image is read corresponding to an application and a purpose.

(5) The following will describe another embodiment of the present invention.

In this embodiment, an operating section, not shown, of the image forming apparatus is provided with a function to select and specify a kind of an original such as a monochromatic image, a color image, a character image, or a picture image. Therefore, control is provided so that preliminary original reading may be performed by moving the standby position 102 corresponding to the specified kind of the original, according to the preliminary original reading system of the present invention described in (3) above.

For example, in the case of a monochromatic character image, the EE defined as being appropriate can be set easily, so that the preliminary original reading range (spacing between the image front end DA and the standby position 102) is set small to make EE settings defined as being appropriate, based on main-scan directional image density reading which has been performed a small number of times. In the case of a color picture image, on the other hand, EE set values defined as being appropriate cannot easily be set, so that the preliminary original reading range is set large to read the image density a large number of times for each of the B, G, and R colors in the main-scan direction, thus permitting the control section to obtain the EE set values defined as being appropriate through, for example, creation of a histogram of read data.

Therefore, in the present embodiment, the standby position 102 linked with a specified kind of the original is prepared as a table beforehand, so that when the specified kind of the original is detected, the control section sets the standby position 102 from the table, based on which standby position, preliminary original reading is performed.

According to the present embodiment, any originals, irrespective of the kinds thereof, are given the respective minimum required preliminary original reading time to set appropriate EE processing conditions.

According to the first aspect of the present invention, control is provided so that a shading operation may be performed after a preliminary original reading operation, thereby making it possible to reduce a time to be spent until the start of primary original image reading.

According to the second aspect of the present invention, in both cases of copying in a condition where the platen cover is open and copying in a condition where it is closed, no time is spent in the APS operation for determination of the original size, thus making it possible to reduce a time to be spent until the start of primary original image reading.

According to the third aspect of the present invention, the apparatus has also the system that enables altering a preliminary original reading operation time for automatic original density determination in accordance with a required degree of an image quality, so that it is possible to select either reducing the time to be spent until the start of primary original image reading or enabling sophisticated automatic original density determination at the cost of the time.

According to the fourth aspect, as the user selects the kind of originals such as a photograph image, a print image, or a color image, the original scan region changes, so that sophisticated automatic original density is determined while reducing the time to be spent until the start of primary original image reading.

According to the fifth aspect of the present invention, an image forming apparatus is provided which is equipped with an image reading apparatus having the effects described in relation to the first through fourth aspects and which forms an image by using image data read by the image reading apparatus, thereby satisfying user's requirements.

What is claimed is:

1. An image reading apparatus comprising:
a scan optical system having an image pickup device for reading an original mounted on a platen glass; and
a control section for controlling a preliminary original reading operation for automatically determining a density of the original to be performed before the original is read, and for controlling a white background level correction operation of the image pickup device to be performed after the preliminary original reading operation;
wherein the preliminary original reading operation is performed while the scan optical system is moving from a read standby position facing the original to an image read operation start position;
wherein the preliminary original reading operation comprises obtaining density data of the original; and
wherein a result of the white background level correction operation by the image pickup device is reflected on the density data of the original, thus controlling an original density decision.

2. The image reading apparatus according to claim 1, wherein the scan optical system performs the reading of the original after the white background level correction operation by the image pickup device.

3. The image reading apparatus according to claim 1, wherein the image pickup device comprises a CCD sensor.

4. The image reading apparatus according to claim 3, wherein the CCD sensor converts the read original into a digital signal.

5. The image reading apparatus according to claim 1, wherein the preliminary original reading operation comprises reading a part of the original.

6. The image reading apparatus according to claim 1, wherein the preliminary original reading operation comprises detecting a size of the original.

7. The image reading apparatus according to claim 1, wherein the control section is operable to specify a kind of the original and adjusts the read standby position of the scan optical system to correspond to the specified kind of the original.

8. The image reading apparatus according to claim 1, wherein the control section is operable to specify a kind of the original and adjusts a read region of the preliminary original reading operation to correspond to the specified kind of the original.

9. An image reading apparatus for reading an image of a original mounted on a platen glass by scanning the original with a scan optical system using an image pickup device, wherein:
the apparatus has a function to perform a preliminary original read operation for automatically determining a density of the original before the original image is read; and
preliminary original reading is performed when the scan optical system in an idling state is moving from a read standby position to an image reading operation start position, a white background level correction operation of the CDD sensor is performed after original density data are collected by the preliminary original reading operation, and a result of the correction is reflected on the original density data obtained by the preliminary original reading, to control decision of the original density.

10. The image reading apparatus according to claim 9, wherein if the preliminary original reading operation is performed in a condition where a platen cover is open, detection of a original size in a main scan direction and determination of an original density are performed simultaneously based on image data collected by the preliminary original read operation, and if the preliminary original reading operation is performed in a condition where the platen cover is closed, the original size is detected in a process of the platen cover being closed.

11. The image reading apparatus according to claim 9, having a preliminary original reading system for performing a preliminary original reading operation independently of a preliminary original reading system for performing the preliminary original read operation when a scan optical system is moving from a read standby position to an image read operation start position, thus enabling changing the preliminary original reading systems by setting.

12. The image reading apparatus according to claim 9, having a function for permitting a user to specify a kind of a original so that the read standby position may be altered in accordance with the specified kind of the original in a condition where the kind of the original is specified, thus changing an original scan region at the time of preliminary original reading.

13. An image forming apparatus equipped with the image reading apparatus according to claim 9, wherein an image is formed using data of an image read by the image reading apparatus.

14. The image forming apparatus according to claim 9, wherein the image pickup device comprises a CCD sensor.

* * * * *